United States Patent [19]

Yamabe et al.

[11] Patent Number: 4,941,561
[45] Date of Patent: Jul. 17, 1990

[54] ARTICLE SORTING DEVICE

[75] Inventors: Keiji Yamabe; Masao Yoshinaga, both of Tokyo, Japan

[73] Assignee: Nihon Cement Co., Ltd., Tokyo, Japan

[21] Appl. No.: 399,325

[22] Filed: Aug. 28, 1989

[30] Foreign Application Priority Data

Feb. 27, 1987 [JP] Japan .................................. 62-28932

[51] Int. Cl.$^5$ ............................................. B65G 47/46
[52] U.S. Cl. .................................... 198/365; 198/370; 198/372; 198/802
[58] Field of Search ............... 198/370, 372, 365, 802, 198/474.1

[56] References Cited

U.S. PATENT DOCUMENTS

| | | | |
|---|---|---|---|
| 3,361,247 | 1/1968 | Lauzon et al. | 198/370 X |
| 3,735,867 | 5/1973 | Vanderhoof et al. | 198/365 X |
| 3,986,596 | 10/1976 | Hamilton | 198/365 |
| 3,987,888 | 10/1976 | Wickam | 198/365 |
| 4,508,206 | 4/1985 | Moore et al. | 198/365 |
| 4,637,508 | 1/1987 | Kikuchi et al. | 198/365 |
| 4,717,011 | 1/1988 | Yu et al. | 198/365 |
| 4,738,347 | 4/1988 | Brouwer et al. | 198/365 X |
| 4,760,908 | 8/1988 | Houghton | 198/365 |
| 4,817,779 | 4/1989 | Beck et al. | 198/365 |

Primary Examiner—Robert J. Spar
Assistant Examiner—D. Glenn Dayoan
Attorney, Agent, or Firm—McGlew & Tuttle

[57] ABSTRACT

In an article sorting device equipped with a pair of endless chains that are arranged facing with each other, and are constructed so as to be driven to rotate in the same direction; a plurality of article conveying boards that are mounted on the endless chains in a condition slidable in a direction perpendicular to the direction in which the pair of endless chains are driven, with sorting pins attached to the bottom surface of each of the boards; and a pair of sorting members that enter the moving paths of the sorting pins, and guide the subsequent sorting pins in predetermined directions; the article sorting device characterized in that a downward slanted part is provided at each end part that traverses the moving path of the sorting pin of the sorting members, the upper edges of the slanted parts are formed in a wedge shape, and the lower end parts of the sorting pins that correspond to the slanted parts of the sorting members are formed in a conical form.

2 Claims, 5 Drawing Sheets

FIG. 7
FIG. 8
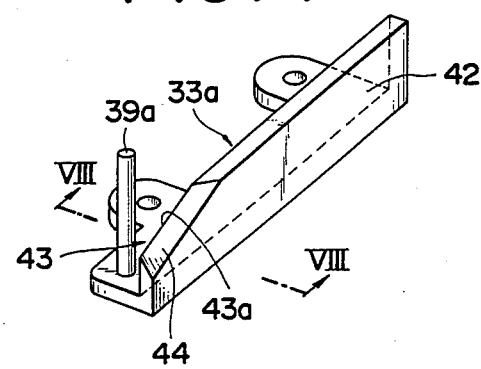
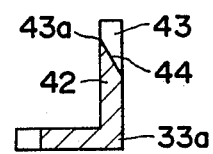
FIG. 9
FIG. 10
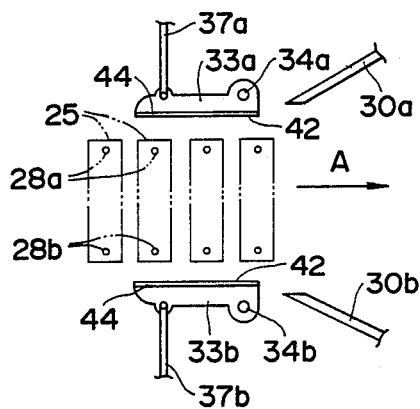
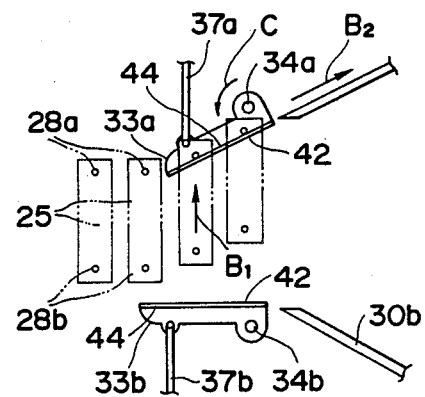

ARTICLE SORTING DEVICE

FIELD OF THE INVENTION AND RELATED ART STATEMENT:

The present invention relates to an article sorting device which sorts articles that are carried placed on conveying boards in predetermined directions according to the weight, size or the like of the articles.

In FIG. 15 and FIG. 16 which show the sorting mechanism in the conventional article sorting device of the above description, 1 is a article conveying board on which is placed an article to be carried, 2a and 2b are sorting pins that extend downward from the rear surface of the conveying board 1, 3 is a bar disposed to be mutually parallel between a pair of endless chains (not shown) and are fitted respectively to the side grooves 1a of the article conveying board 1, 4a and 4b are sorting gates which guide the sorting pins 2a and 2b in a predetermined direction, 5a and 5b are driving shafts which turn the sorting gates 4a and 4b, and 6a and 6b are guide rails.

The conventional article sorting device described above operates as in the following.

First, as a prescribed article is carried in the direction of the arrow A placed on the article conveying board 1, the kind of the article is discriminated in an article discriminating device (not shown) based on the weight, size or the like of the article, and the sorting gates 4a and 4b are turned by the driving shafts 5a and 5b.

Namely, when a signal for rectilinear motion is output from the article discriminating device, the tip portions of the sorting gates 4a and 4b are arranged at positions away from the moving paths of the sorting pins 2a and 2b, as indicated by the solid line in FIG. 15. Because of this, the article conveying board 1 and the article thereon are moved rectilinearly without being their direction of motion altered by the guide rails 6a and 6b. Further, when a signal to bear left is output from the article discriminating device, only one of the sorting gates, namely, 4a, is turned in the direction of the arrow P as shown by the broken line in FIG. 15, and As a result, the sorting pin 2a engages with the sorting gate 4a as shown in FIG. 17 so that the article conveying board 1 is directed to move to bear left with respect to its direction of proceeding A, and is moved in a prescribed direction along the guide rail 6a.

Moreover, when a signal to bear right is output from the article discriminating direction, only the sorting gate 4b enters the moving path of the sorting pin 2b by being turned by the driving shaft 5b, so that the article conveying board 1 is forced to change its direction toward the right, and then is moved in a prescribed direction along the guide rail 6b.

As in the above, the article conveying board 1 is moved selectively in the three directions of straight ahead, bearing left and bearing right according to the turning position of the sorting gates 4a and 4b, whereby articles placed on each of the article conveying board 1 are sorted into groups of three kinds.

However, in the conventional article sorting device as described in the above, the sorting gates 4a and 4b traverse the moving paths of the sorting pins during the turning of the sorting gates 4a and 4b, so that there arises a possibility of having collisions between the tips of the sorting gates 4a and 4b and the sorting pins 2a and 2b. Because of this, especially when article conveying board 1 is moved at high speed in order to improve the efficiency of the sorting work, there were chances of giving damages to the device as a result of violent collisions of the sorting pins 2a and 2b with the tips of the sorting gates 4a and 4b.

OBJECT AND SUMMARY OF THE INVENTION:

The present invention was motivated in view of the circumstances as described in the above, and it is, therefore, the object of the present invention to provide an article sorting device which is constructed so as to be able to guide the sorting pins smoothly without strain by giving no damages to the relevant members even when there are collisions between the sorting pins and the sorting members (sorting gates).

In order to solve the aforementioned problems, in an article sorting device equipped with a pair of endless chains that are arranged opposite with each other and constructed so as to be driven to rotate in the same direction, a plurality of article conveying boards that are attached to the endless chains under the condition slidable in a direction perpendicular to the driven direction of the pair of endless chains, with sorting pins fixed on the bottom face side of each of the board, and a pair of sorting members which guide the succeeding sorting pins in prescribed directions by entering the moving paths of the sorting pins, there are provided slanted parts at the ends, on the sides that traverse the moving paths of the sorting pins, of the sorting members, the upper edges of the slanted parts are formed in a wedge shape, and the lower end parts of the sorting pins that correspond to the slanted parts of the sorting members are formed in a conical shape.

Referring to FIG. 1 to FIG. 14, an embodiment of the present invention will now be described in detail in what follows.

BRIEF DESCRIPTION OF THE DRAWINGS:

FIG. 1 to FIG. 14 are for describing embodiment of the present invention in which FIG. 1 is an overall perspective view of the article sorting device, FIG. 2 is a plan view of the device shown in FIG. 1 from which the endless chains, parallel rods and article conveying boards are dismantled, FIG. 3 is a disassembled perspective view showing the mounting condition of the article conveying boards, FIG. 4 is a sectional diagram as seen along the line IV—IV in FIG. 3, FIG. 5 is a magnified plan view of the sorting gate part, FIG. 6 is a sectional view as seen in the line VI—VI in FIG. 5, FIG. 7 is a perspective view of the sorting gate, FIG. 8 is a sectional view in the line VII—VII in FIG. 7, FIG. 9, FIG. 10 and FIG. 11 are plan views showing the operation of the sorting gates and the article conveying board, and FIG. 12, FIG. 13 and FIG. 14 are plan views showing the operation of the sorting gates and the stopper member. FIG. 15 to FIG. 17 are for explaining the article conveying mechanism in the conventional article sorting device, wherein FIG. 15 is an elevation of article sorting mechanism, FIG. 16 is a plan view of the article sorting mechanism, and FIG. 17 is a plan view showing the operation at the time of changing the direction of the article conveying boards.

Figure 1:
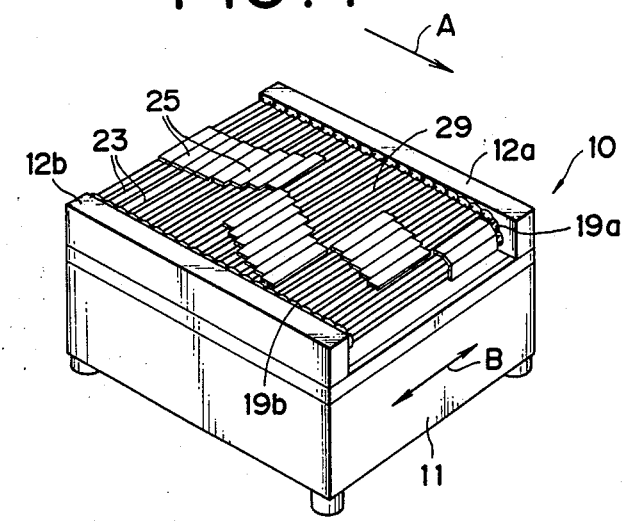
Figure 2:
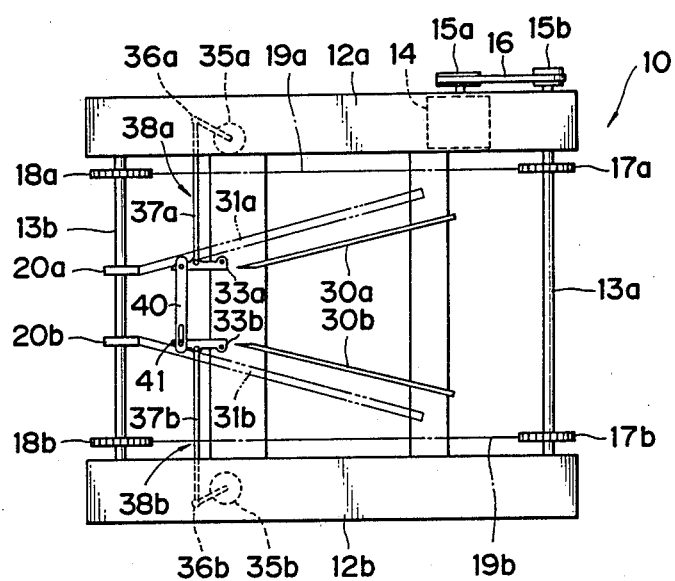

DETAILED DESCRIPTION OF PREFERRED EMBODIMENT:

FIG. 1 and FIG. 2 show the article sorting device of the present embodiment. In these figures, 11 is a base, 12a and 12b are a pair of side boards mounted in parallel on the base 11, and a pair of revolving shafts 13a and 13b are mounted rotatably between the side boards 12a and 12b. One of the revolving shaft, 13a, is arranged to be driven to rotate by a driving mechanism consisting of a motor 14, pulleys 15a and 15b and a belt 16. Further, on the ends of the revolving shafts 13a and 13b there are fixed sprockets 17a and 17b and 18a and 18b, respectively, and a pair of endless chains 19a and 19b are engaged between the sprockets 17a and 18a and 17b and 18b, respectively. In this way, a pair of endless chains 19a and 19b are arranged opposing with each other, and are driven to be rotated with constant speed along the direction of the arrow A in FIG. 1 and FIG. 2. A pair of disk-shaped guides 20a and 20b are mounted on the other revolving shaft 13b as shown in FIG. 2.

Figure 3:
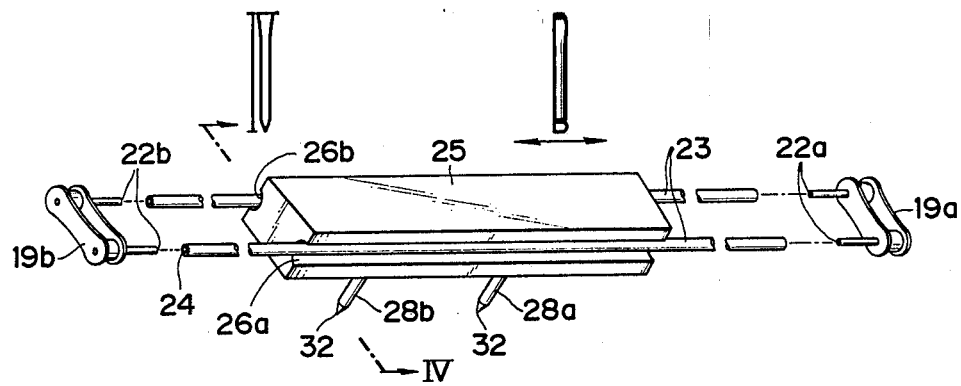
Figure 4:
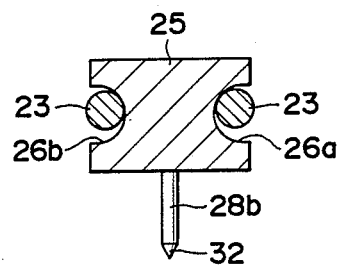

Mounting pins 22a and 22b are provided with a predetermined pitch on the pair of endless chains 19a and 19b, pointing inwardly as shown in FIG. 3, and these mounting pins 22a and 22b are fitted to the holes 24 formed on both ends of the parallel rods 23. In the above manner, a multitude of parallel rods 23 are provided side by side between the pair of endless chains 19a and 19b, with an article conveying board 25 arranged slidably between two adjacent parallel rods 23.

That is to say, on both side faces of the article conveying board 25 there are formed side grooves 26a and 26b with substantially U-shaped cross section, extending in the longitudinal direction, with the parallel rods 23 are fitted respectively into the side grooves 26a and 26b. The article conveying board is given a construction in which it is slidable along the parallel rod 23 in the direction of the arrow B in FIG. 1 and FIG. 3 (a direction perpendicular to the direction of motion A of the endless chains 19a and 19b) under the guiding action between the side grooves 26a and 26b and the parallel rods 23.

In this way, an endless conveyor 29 is formed by endless chains 19a and 19b, parallel rods 23 and article conveying boards 25.

In the vicinity at both end parts on the bottom surface of the article conveying board 25, there are fixed two sorting pins 28a and 28b perpendicularly to the surface, and there is provided a mechanism that guides the sorting pins in prescribed directions in the interior of the endless conveyor 29.

Namely, as shown in FIG. 2, in the upper part of the interior of the endless conveyor 29, there are disposed a pair of guide rails 30a and 30b so as to expand as one moves to the downstream side in the direction of progress A of the endless chains 19a and 19b. In the lower part of the interior of the endless conveyor 29, there are disposed recovery rails 31a and 31b.

Figure 5:
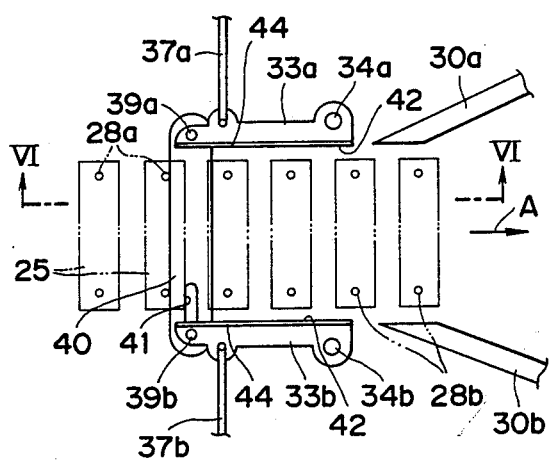

In addition, as shown in FIG. 2 and FIG. 5, sorting gates 33a and 33b as sorting members are mounted turnably on supporting shafts 34a and 34b, in the region between the guides 20a and 20b and the guide rails 30a and 30b. These sorting gates 33a and 33b are so constructed as to be turned by driving mechanisms 38a and 38b consisting of the driving devices 35a and 35b, joints 36a and 36b and coupling rods 37a and 37b. Further, as shown clearly in FIG. 5, a pin 39a fixed to the tip of one of the sorting gates, 33a, is attached pivotally to one end of a plate-like stopper member 40, and a pin 39b fixed to the tip of the other sorting gate 33b is arranged movably inserted to a slot 41 formed at the other end of the stopper member 40. The slot 41 is formed so as to extend in the longitudinal direction of the stopper member 40, namely, along the direction joining the pins 39a and 39b.

The sorting gates 33a and 33b are formed by bending a plate-like member so as to have an L-shaped cross section, as shown in FIG. 7 and FIG. 8. The corner part of the front upper side of the vertical piece 42 is notched to form a slanted part 43, and the upper edge 43a of the slanted part 43 is formed in a wedge form (blade-form). The slanted part 43 is formed so as to approach the bottom surface of the article conveying board 25 as one moves in the direction of progress A of the article conveying board 25. At the same time, the slanted face 44 at the wedge-like upper edge 43a is formed on the inner side (on the side of the facing surface) of the sorting gates 33a and 33b.

Figure 6:
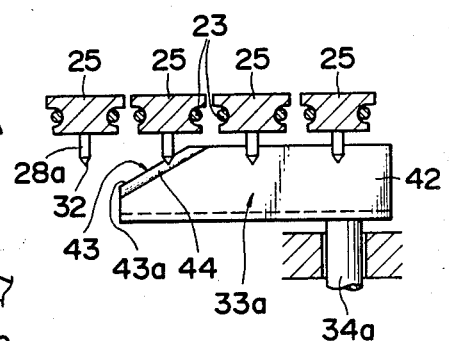

On the other hand, the lower end 32 of the sorting pins 28a and 28b is formed conically corresponding to the slanted part 43 as shown in FIG. 3 and FIG. 6.

Next, referring to FIG. 2 and FIG. 9–FIG. 14, the operation of the article conveying device with the above constitution will now be described.

First, when the revolving shaft 13a is driven to be rotated by the motor 14, the endless conveyor 29 is rotated via endless chains 19a and 19b that are engaged with the sprockets 17a and 17b and 18a and 18b. Then, with the rotation of the endless conveyor 29, the article conveying boards 25 are carried in the direction of the arrow A in FIG. 9 while the sorting pins 28a and 28b on their bottom surfaces are guided by the guides 20a and 20b. In this case, the kind of the articles placed on the article conveying boards 25 is discriminated by an article discriminating device, not shown, based, for example, on the weight of the articles.

When it is discriminated that the weight of the article is normal, the sorting gates 33a and 33b are held at the retracted positions as shown in FIG. 9 based on a prescribed output signal from the article discriminating device. Therefore, the pair of sorting pins 28a and 28b move within the region between the sorting gates 33a and 33b and the guide rails 30a and 30b without being engaged with them. Accordingly, the article conveying board and the article placed on the top surface of the board are carried straight ahead along a first course without change in their direction of advance. The article is transferred to a transporting conveyor, not shown, at the right end (namely, the end part on the downstream side) of the endless conveyor 29 to be transported further.

When the article has a weight smaller than the normal weight, one of the sorting gates, 33a, is turned by the driving mechanism 38a in the direction of the arrow C in FIG. 10 with the supporting shaft 34a as the center, based on an output signal from the article discriminating device. It is to be noted that the other sorting gate 33b is held at the retracted position without being turned. Since the sorting gate 33a enters the moving path of the sorting pins, the sorting pin 28a that comes advancing straight ahead engages with the outer face of the sorting gate 33a, and is pushed in the direction of the arrow $B_1$ in FIG. 10. As a result, the sorting pin 28a is moved along the sorting gate 33a that is disposed with a predetermined angle with respect to the direction of advancing A of the article conveying board 25, and is then guided by the guide rail 30a to be moved along a second course. An article whose moving direction is changed to that of the second couse in this manner is transferred to another transporting conveyor, not shown, at the right end of the endless conveyor 29 to be transported further.

Figure 11:
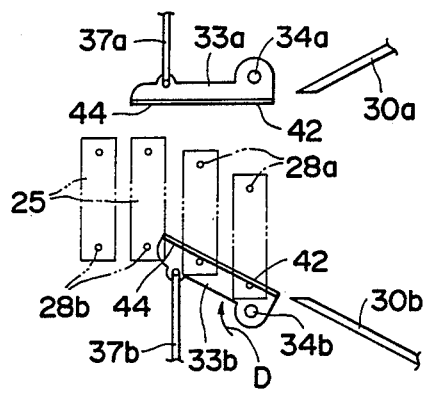

Further, when the weight of the article is greater than the normal weight of the article, only the sorting shown in FIG. 11, and the sorting pin 28a is pushed in the direction opposite to that of the arrow B₁ by being engaged with the sorting gate 33b. Therefore, the article conveying board 25 is guided in succession by the sorting gate 33b and the guide rail 30b to be moved along a third course. In the manner described above, articles placed on the article conveying boards 25 are sorted into three kinds according to their weights.

Figure 12:
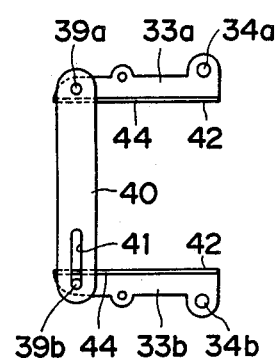
Figure 13:
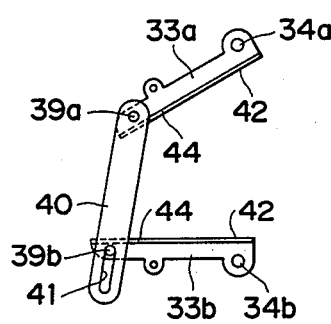
Figure 14:
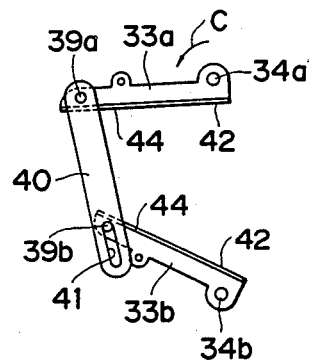
Figure 15:
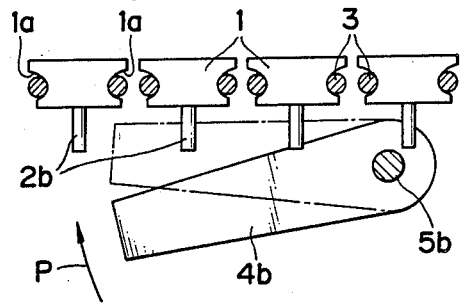
Figure 16:
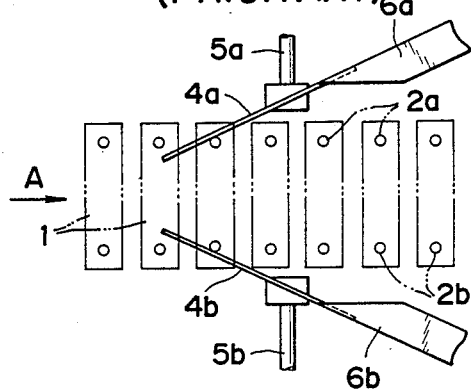
Figure 17:
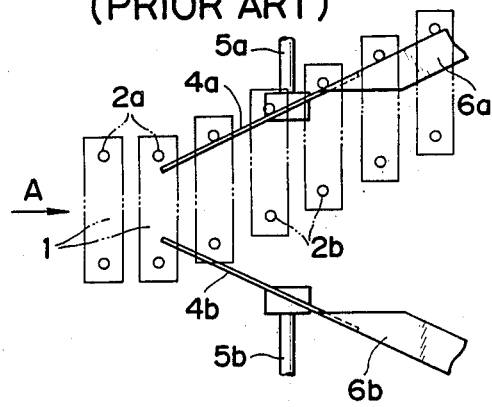

It is to be noted here that in case both of the sorting gates 33a and 33b are operated at the same time due to a mal-function, the sorting pins 28a and 28b are engaged with the sorting gates 33a and 33b at the same time, so that there is a chance of giving damages to the device. However, in the present embodiment, there is provided a stopper member 40 which is linked to the sorting gates 33a and 33b as mentioned earlier, so that the malfunction of the sorting gates 33a and 33b can be prevented without failure. That is to say, when the sorting gates 33a and 33b are at their retracted positions (nonoperating position), the pins 39a and 39b are at the farthest separated positions as indicated in FIG. 12. If the sorting gate 33a is turned in the direction of the arrow C under these circumstances, the stopper member 40 is moved as shown in FIG. 13, and the pin 39b engages with one end of the slot 41 of the stopper member 41. Because of this, turning of the other sorting gate 33b in the direction of the arrow D (operating direction) is obstructed. Further, if the other sorting gate 33b is turned in the direction of the arrow D as shown in FIG. 14, the pin 39b is made to be engaged with the end of the slot 41, so that the turning of the sorting pin 28a in the direction of the arrow C is obstructed.

In accordance with the article sorting device of the present embodiment described as in the above, there exists a possibility, though minute, of having a mutual collision between the sorting gate 33a or 33b and the sorting pin 28a or 28b, since the former traverses while it is being turned the moving path of the latter. However, in the case of the present embodiment, there will be no possibility of bringing about such inconvenience as to give damages to the device even if there occurred a collision between the above-mentioned components.

That is, assuming that the sorting pins 28a or 28b collided with the tip of the sorting gate 33a or 33b, the conical lower end part 32 of the sorting pin 28a or 28b abuts on the upper edge 43a of the slanted part 43 of the sorting gate 33a or 33b, so that the sorting pin 28a or 28b receives an upward directed force component. On the other hand, the article conveying board 25 is held with some backlash by two parallel rods 23 that are fitted to the side grooves of the board, so that when the upward directed component force is applied to the article conveying board 25 via the sorting pin 28a or 28b, the board can run off in the upward direction albeit a very minute distance. Accordingly, there will act no excessive forces on the article conveying board 25 and the sorting pin 28a or 28b at the time of the collision thanks to the above-mentioned relief action, accomplishing an effective absorption of the colliding force.

Moreover, when the lower end part 32 of the sorting pin 28a or 28b collides with the upper edge 43a or 43b and is about to slide up the edges, the collisional condition is canceled immediately by the shifting of the sorting pin 28a or 28b to the inner side (side toward the center) of the sorting gate 33a or 33b. Namely, since the sorting gate is disposed with certain angle with respect to the direction of advancing, A, of the article conveying board 25, the engaged condition between the two components will be released within an extremely short time while the article conveying board 25 is being displaced in the upward direction. Moreover, the sorting pin 28a or 28b slides down smoothly to the inside of the sorting gate 33a or 33b immediately after the collision, due to the guiding action between the slanted face 44 formed on the inside of the upper edge 43a and the conical surface of the lower end part 32, to continue to be moved along the first course. Therefore, damages to the device due to collision can be avoided.

Next, the sorting pin 28a or 28b of the article conveying board 25 whose direction has been changed toward the left or the right as described in the above leaves the guide rail 30a or 30b in the vicinity of the right-hand end of the endless conveyor 29 to be accommodated by recovery rail 31a or 31b. Then, the pin is brought nearer to the center of the conveyor by being guided by the recovery rail 31a or 31b, and returns again to the position between the guides 20a and 20b, and repeats the same operation as has been described in the foregoing.

As in the above, an embodiment of the present invention has been described. However, the present invention is not limited to the embodiment, and can be modified or improved based on the technical ideas of the present invention.

For example, in the present embodiment, use has been made of the turning type sorting gates 33a and 33b as the sorting members, but use may be made of a vertical motion type slide board. Further, it is readily possible, if needed, to carry out multilevel classification of three or more kinds by increasing the sorting gates and guide rails.

As described in the foregoing, in the present invention, there are provided downward slanted parts at the end parts, facing along the direction of advancing of the article conveying boards, on the side of the sorting members that traverse the moving paths of the sorting pins. At the same time, the upper edge of the slanted parts are formed in a wedge-like form (blade-like), while the lower end parts of the sorting pins that correspond to the slanted parts of the sorting members are made in a conical form. Therefore, there can be obtained the following advantages:

(1) It is possible to reduce the possibility (probability) of having collisions between the sorting pin and the sorting member.
(2) Even when there occurs a collision between the sorting pin and the sorting member, there will not be applied an excessive force to both members since the article conveying board and the sorting pin can run off, although the distance is small. Moreover, the collision condition between both members can be canceled immediately during a slight displacement of the run-off of the article conveying board, with a smooth sliding down of the sorting pin along the slanted face of the sorting member, to be guided in the predetermined direction. Therefore, damages to the device due to collisions can be prevented without failure.
(3) Accordingly, the service life of the device can be prolonged, and articles can be conveyed stably, which is extremely useful.

We claim:

1. In an article sorting device equipped with a pair of spaced, substantially parallel endless chains which are connected to drive means so as to drive said chains to rotate in a common direction;
   a plurality of article conveying boards that are mounted on said endless chains and slidable in a direction perpendicular to the driven direction of said pair of endless chains, sorting pins attached to a bottom surface thereof for movement along sorting pin moving paths; and
   a pair of sorting members that enter the moving paths of said sorting pins, each sorting member having an end part, and guide the sorting pins in prescribed directions;
   the article sorting device characterized in that a downward slanted part is provided at each end part of said sorting members that enters the moving path of said sorting pin, the slanted parts having upper edges formed in a wedge shape, said sorting pins having lower end parts that correspond to the slanted parts of said sorting members, said lower end parts being formed in a conical form.

2. An article sorting device as claimed in claim 1, wherein a pair of guide rails are provided subsequent to said part of sorting members to guide the sorting pins in a direction along the sorting pin moving path according to said prescribed direction.

* * * * *